T. J. McCARTHY.
BRAKE LOCK FOR AUTOMOBILES.
APPLICATION FILED FEB. 7, 1920.
1,362,124.
Patented Dec. 14, 1920.
*Fig. 1.*
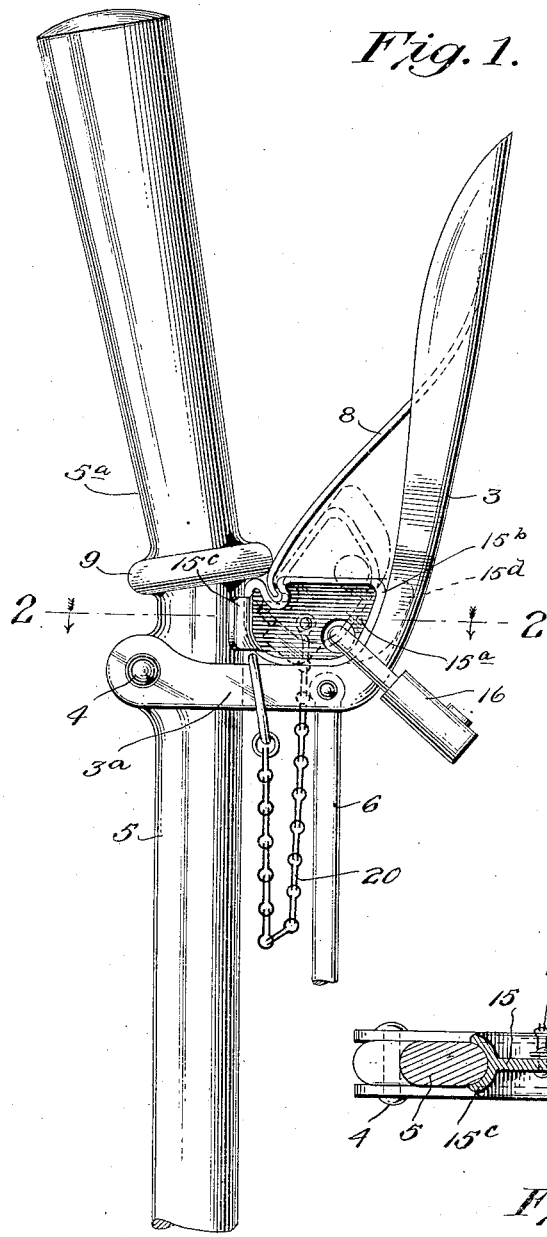
*Fig. 3.*
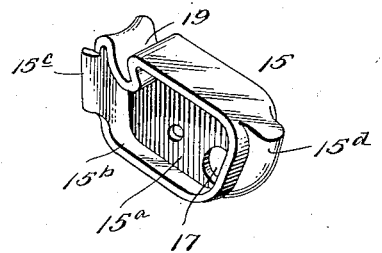
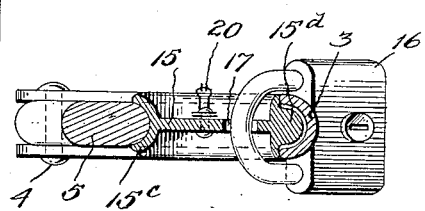
*Fig. 2.*
Inventor
Thomas J. McCarthy
By Eugene E. Brown
Attorney

UNITED STATES PATENT OFFICE.

THOMAS J. McCARTHY, OF NEWARK, NEW JERSEY.

BRAKE-LOCK FOR AUTOMOBILES.

1,362,124. Specification of Letters Patent. Patented Dec. 14, 1920.

Application filed February 7, 1920. Serial No. 357,079.

*To all whom it may concern:*

Be it known that I, THOMAS J. MC-CARTHY, a citizen of the United States, residing at Newark, in the county of Essex and State of New Jersey, have invented certain new and useful Improvements in Brake-Locks for Automobiles, of which the following is a specification.

This invention relates to a lock for the emergency brake of an automobile and its object is to provide a simple device which may be readily inserted between the main lever and the release lever and be secured by a padlock or other suitable lock.

In the following description I shall refer to the accompanying description in which—Figure 1 is a side elevation of the upper end of an emergency brake, such as used on the Ford cars, equipped with a brake-lock embodying my invention; Fig. 2 is a transverse sectional view taken on the line 2—2 of Fig. 1; and Fig. 3 is a perspective view of the locking device.

The lever mechanism is of a well known construction. The release lever 3 provided with a transverse portion 3ª is fulcrumed at 4 on the main lever 5 of the emergency brake, and to which the release connecting rod 6 is pivoted. In this type of brake lever, the release lever handle 3 carries a spring 8 which bears at its lower free end against the side of an annular flange 9 at the base of the main grip or handle portion 5ª and maintains the release lever 3 in normal extended position. As is well understood, the release lever 3 must be moved toward the main lever handle 5ª in order to lift the connecting rod 6 and disengage the dog on the lower end of the rod 6 from the rack or quadrant which holds it in any adjusted position. When the lever is moved back into the position which causes an engagement of the brake bands it is necessary to move the lever 3 toward the handle 5ª in order to release the main lever 5 and throw off the brakes. Consequently if the release lever handle 3 is locked in its outer position it is impossible to release the brakes.

For the purpose of preventing any movement of the release lever handle I provide a locking block 15 which is shaped to fit between the release lever 3 and the main lever 5 with its lower side bearing on the transverse portion of the release lever and may be secured in this position by means of a padlock 16 the shackle of which is passed through a hole 17 in the block and surrounds the lever 3 at its narrowest part.

The locking block may be a die casting and in my preferred form comprises a central web 15ª and a marginal flange portion 15ᵇ extending upon either side of the web, the flange at one end being curved or dished and preferably provided with extensions or ears 15ᶜ to partly embrace the lever 5, and at the opposite end being provided with a protuberance or rib 15ᵈ which fits into the recess in the release lever handle 3. The ears 15ᶜ on one end and the rib 15ᵈ on the opposite end prevent any lateral movement of the locking block so that it is secured against movement in any direction by inserting the shackle of the padlock through the hole 17.

The locking block is inserted or removed by a rocking or tilting movement, being first placed in the position indicated in Fig. 1 in dotted lines and then rocked or slid into the locked position shown in full lines. To accommodate the end of the spring 8, I form a notch or recess 19 in the upper edge of the marginal flange. The notch is preferably of such size and shape that the spring may lie within without engaging its walls so that the locking block 15 lies between the handle 3 of the emergency lever, and the main lever 5 and not between the emergency handle and the spring.

If desired the locking block may have a chain 20 attached to suspend the block when not in use.

I have described in detail the particular construction illustrated in the accompanying drawings for the purpose of disclosing one embodiment of my invention, but it will be evident to engineers that various changes and modifications can be made without departing in any manner from the inventive idea.

I claim:—

1. A locking device for emergency brake levers, comprising a main brake lever, a release lever pivoted thereto, and a locking block provided on one end with means for embracing a portion of the main brake lever and upon the opposite end with means for entering a recess in the release lever of the brake when the lower side of the block is seated on the transverse pivoted end portion of said release lever, said block having an aperture to receive the hasp of a padlock.

2. A locking device for emergency brake levers, comprising a main brake lever, a release lever pivoted thereto, and a block having a central web and a peripheral flange perpendicular thereto, said flange being provided at one end with a recessed portion adapted to embrace the main brake lever and at the opposite end with a projection adapted to enter the usual recess in the release lever of the brake, said web having an aperture adapted to receive the hasp of a padlock.

3. In combination an emergency brake lever provided with a projecting flange at the base of the handle portion, a release lever pivoted thereto, and a locking device comprising a block provided on one end with a projection adapted to enter a recess in the release lever of the brake and at the opposite end with a recess to embrace the main brake lever and with a shoulder to engage the underside of said flange, said block having an aperture to receive the hasp of a padlock.

4. A locking device for automobiles, comprising a main brake lever, a release lever pivoted thereto, and a locking block provided on one end with means for embracing a portion of said main lever and upon the opposite end with means for entering a recess in said release lever when the lower side of the block is seated on the transverse pivoted end portion of said release lever, and means for locking said block against movement.

In testimony whereof I affix my signature.

THOMAS J. McCARTHY.